(12) United States Patent
Rodriguez et al.

(10) Patent No.: US 11,945,151 B2
(45) Date of Patent: Apr. 2, 2024

(54) ADDITIVELY MANUFACTURING BIO-BASED CONDUCTIVE SHAPE MEMORY POLYMER MACOSTRUCTURE PARTS WITH HIGHLY ORDERED MICROSTRUCTURES

(71) Applicant: LAWRENCE LIVERMORE NATIONAL SECURITY, LLC, Livermore, CA (US)

(72) Inventors: Jennifer Nicole Rodriguez, Fremont, CA (US); Eric B. Duoss, Dublin, CA (US); James Lewicki, Oakland, CA (US); Christopher Spadaccini, Oakland, CA (US); Thomas S. Wilson, Oakland, CA (US); Cheng Zhu, Livermore, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 0 days.

(21) Appl. No.: 17/820,144

(22) Filed: Aug. 16, 2022

(65) Prior Publication Data

US 2022/0402194 A1    Dec. 22, 2022

Related U.S. Application Data

(62) Division of application No. 15/762,494, filed on Mar. 22, 2018, now abandoned.

(51) Int. Cl.
*B29C 64/00* (2017.01)
*B29C 64/106* (2017.01)
(Continued)

(52) U.S. Cl.
CPC .......... *B29C 64/106* (2017.08); *B29C 64/165* (2017.08); *B29C 64/209* (2017.08); *B29C 64/321* (2017.08); *B29C 64/393* (2017.08); *B33Y 70/10* (2020.01); *C08K 3/046* (2017.05); *C08K 7/04* (2013.01); *C08L 63/00* (2013.01);
(Continued)

(58) Field of Classification Search
CPC .............................. B29C 64/106; C08K 3/046
See application file for complete search history.

(56) References Cited

U.S. PATENT DOCUMENTS

| 6,528,571 B1 | 3/2003 | Erhan et al. |
| 2004/0044147 A1 | 3/2004 | Kamae et al. |

(Continued)

FOREIGN PATENT DOCUMENTS

| WO | 2014-110679 | 7/2014 |
| WO | 2015-148521 A1 | 10/2015 |

OTHER PUBLICATIONS

Ge et al., "Active Materials by Four-Dimension Printing," Appl. Phys. Lett. 103,131901, 2013, pp. 131901-1 to 131901-5.
(Continued)

*Primary Examiner* — Nicholas R Krasnow
(74) *Attorney, Agent, or Firm* — James S. Tak

(57) ABSTRACT

An additive manufacturing apparatus includes an additive manufacturing print head and a nozzle that receives a bio-based shape memory polymer material and a bio-based
(Continued)

material. The nozzle extrudes the bio-based shape memory polymer material and the bio-based material onto a substrate to form a bio-based shape memory polymer part or product.

1 Claim, 3 Drawing Sheets

(51) Int. Cl.
B29C 64/165 (2017.01)
B29C 64/209 (2017.01)
B29C 64/321 (2017.01)
B29C 64/393 (2017.01)
B33Y 70/10 (2020.01)
C08K 3/04 (2006.01)
C08K 7/04 (2006.01)
C08L 63/00 (2006.01)
C08L 91/00 (2006.01)
B29K 63/00 (2006.01)
B29K 105/12 (2006.01)
B29K 507/04 (2006.01)
B33Y 10/00 (2015.01)
B33Y 30/00 (2015.01)
B33Y 50/02 (2015.01)
B33Y 80/00 (2015.01)

(52) U.S. Cl.
CPC .......... C08L 91/00 (2013.01); B29K 2063/00 (2013.01); B29K 2105/124 (2013.01); B29K 2507/04 (2013.01); B33Y 10/00 (2014.12); B33Y 30/00 (2014.12); B33Y 50/02 (2014.12); B33Y 80/00 (2014.12); C08K 2201/011 (2013.01)

(56) References Cited

U.S. PATENT DOCUMENTS

| 2004/0226620 | A1 | 11/2004 | Therriault et al. |
| 2010/0210745 | A1 | 8/2010 | McDaniel et al. |
| 2014/0035995 | A1 | 2/2014 | Chou et al. |
| 2014/0314954 | A1 | 10/2014 | Lewis et al. |
| 2014/0328964 | A1 | 11/2014 | Mark et al. |
| 2015/0291833 | A1 | 10/2015 | Kunc et al. |
| 2015/0352787 | A1 | 12/2015 | Humbert et al. |
| 2016/0114077 | A1 | 4/2016 | Song |
| 2016/0289491 | A1* | 10/2016 | Li ........................ C08G 59/686 |
| 2018/0243984 | A1 | 8/2018 | Hayashida et al. |

OTHER PUBLICATIONS

Lewis, "Direct Ink Writing of 3D Functional Materials", Adv. Funct. Mater. 2006, 16, 2006, pp. 2193-2204.
Mao et al., "Sequential Self-Folding Structures by 3D Printed Digital shape Memory Polymers," Scientific Reports, 5:13616, 2015, pp. 1-12.
Shaffer et al, "On Reducing Anisotropy in 3D Printed Polymers Via Ionizing Radiation," Polymer 55, 2014, pp. 5969-5979.
Yu et al., "Controlled Sequential Shape Charging Components by 3D Printing of Shape Memory Polymer Multiaterials," Procedia IUTAM 12, 2015, pp. 193-203.
Zarek et al., "3D Printing of Shape Memory Polymers for Flexible Electronic Devices," Adv. Mater., vol. 28, No. 22 2015, pp. 4449-4454.
Written Opinion and International Search Report for PCT/US2016/058712, corresponding to U.S. Appl. No. 17/820,144, 9 pages.

* cited by examiner

ADDITIVELY MANUFACTURING BIO-BASED CONDUCTIVE SHAPE MEMORY POLYMER MACOSTRUCTURE PARTS WITH HIGHLY ORDERED MICROSTRUCTURES

CROSS-REFERENCE TO RELATED APPLICATIONS

This present application is a Division of application Ser. No. 15/762,494 filed Mar. 22, 2018 entitled "ADDITIVELY MANUFACTURING BIO-BASED CONDUCTIVE SHAPE MEMORY POLYMER MACOSTRUCTURE PARTS WITH HIGHLY ORDERED MICROSTRUCTURES," which is a national stage application of PCT/US2016/058712, filed on Oct. 25, 2016, which claims priority to and benefit under 35 U.S.C. § 119(e) of U.S. Provisional Patent Application No. 62/249,442 filed Nov. 2, 2015 entitled "a means of additively manufacturing bio-based conductive shape memory polymer macrostructure parts with highly ordered microstructures," the content of which is hereby incorporated by reference in its entirety for all purposes.

STATEMENT AS TO RIGHTS TO APPLICATIONS MADE UNDER FEDERALLY SPONSORED RESEARCH AND DEVELOPMENT

This invention was made with Government support under Contract No. DE-AC52-07NA27344 awarded by the United States Department of Energy. The Government has certain rights in the invention.

BACKGROUND

Field of Endeavor

The present application relates to additive manufacturing and more particularly to additive manufacturing parts and products of shape memory polymer and bio-based materials.

State of Technology

This section provides background information related to the present disclosure which is not necessarily prior art.

The article "The Direct Ink Writing of 3D Functional Materials" by Jennifer A. Lewis, Advanced Functional Materials, 2006, pp. 2193-2204, provides the state of technology information reproduced below.
The term "direct ink writing" describes fabrication methods that employ a computer-controlled translation stage, which moves a pattern-generating device, that is, an ink-deposition nozzle, to create materials with controlled architecture and composition. [11] Several direct ink writing techniques have been introduced that are capable of patterning materials in three dimensions. They can be divided into filamentary-based approaches, such as robocasting [12, 13] (or robotic deposition [4, 7, 14, 15]), micropen writing, [16] and fused deposition, [17, 18] and droplet-based approaches, such as ink-jet printing, [19, 20] and hot-melt printing [21] (see FIG. 1). Many ink designs have been employed including highly shear thinning colloidal suspensions, [12, 13, 16] colloidal gels, [15, 22] polymer melts, [17] dilute colloidal fluids, [20] waxes, [21, 23] and concentrated polyelectrolyte complexes. [4, 24, 25] These inks solidify either through liquid evaporation, [12, 13, 19, 20] gelation, [7, 14, 15] or a temperature- [17, 18] or solvent-induced phase change. [4, 24, 25] Through careful control of ink composition, rheological behavior, and printing parameters, 3D structures that consist of continuous solids, high aspect ratio (e.g., parallel walls), or spanning features can be constructed. Of these, the latter structures offer the greatest challenge for designing inks, because they contain self-supporting features that must span gaps in the underlying layer(s). This feature article focuses primarily on our recent efforts to design concentrated colloidal, [15, 22] fugitive organic, [23] and polyelectrolyte [4, 24, 25] inks for the direct ink writing of 3D periodic architectures with filamentary features ranging from hundreds of micrometers to sub-micrometer in size, and their respective applications as functional composites, [14] microfluidic networks, [7] and templates for photonic bandgap materials [26] and inorganic-organic hybrid structures. [25] Future opportunities and current challenges for this novel patterning approach are also highlighted.

The article "The Direct Ink Writing of 3D Functional Materials" by Jennifer A. Lewis, Advanced Functional Materials, 2006, pp. 2193-2204, is incorporated herein in its entirety for all purposes by this reference.

The article "Active materials by four-dimension printing" by Qi Ge, H. Jerry Qi, and Martin L. Dunn, APPLIED PHYSICS LETTERS 103, 131901 (2013), provides the state of technology information reproduced below.
We advance a paradigm of printed active composite materials realized by directly printing glassy shape memory polymer fibers in an elastomeric matrix. We imbue the active composites with intelligence via a programmed lamina and laminate architecture and a subsequent thermomechanical training process. The initial configuration is created by three-dimension (3D) printing, and then the programmed action of the shape memory fibers creates time dependence of the configuration—the four-dimension (4D) aspect. We design and print laminates in thin plate form that can be thermomechanically programmed to assume complex three-dimensional configurations including bent, coiled, and twisted strips, folded shapes, and complex contoured shapes with nonuniform, spatially varying curvature. The original flat plate shape can be recovered by heating the material again. We also show how the printed active composites can be directly integrated with other printed functionalities to create devices; here we demonstrate this by creating a structure that can assemble itself.

The article "Active materials by four-dimension printing" by Qi Ge, H. Jerry Qi, and Martin L. Dunn, APPLIED PHYSICS LETTERS 103, 131901 (2013 is incorporated herein in its entirety for all purposes by this reference.

The article "On reducing anisotropy in 3D printed polymers via ionizing radiation" by Steven Shaffer, Kejia Yang, Juan Vargas, Matthew A. Di Prima, and Walter Voit, Polymer 55 (2014) 5969e5979, provides the state of technology information reproduced below.
The mechanical properties of materials printed using fused filament fabrication (FFF) 3D printers typically rely only on adhesion among melt processed thermoplastic polymer strands. This dramatically limits the utility of FFF systems today for a host of manufacturing and consumer products and severely limits the toughness in 3D printed shape memory polymers. To improve the interlayer adhesion in 3D printed parts, we introduce crosslinks among the polymer chains by exposing 3D printed copolymer blends to ionizing radiation to strengthen the parts and reduce anisotropy. A series polymers blended with specific radiation sensitizers, such as trimethylolpropane triacrylate (TMPTA) and trialylisocyanurate (TAIC), were prepared and irradiated by gamma rays. Differential scanning calorimetry (DSC), tensile testing, dynamic mechanical analysis (DMA) and attenuated total reflectance Fourier transform infrared spectroscopy (ATR-FTIR) were employed to characterize the thermomechanical properties and the chemical structure of the various polymers. TAIC was shown to be a very effective radiation sensitizer for 3D printed sensitized polylactic acid (PLA). The results further revealed that crosslinks induced by radiation temperatures near Tg of shape memory systems have prominently enhanced the thermomechanical properties of the 3D printed polymers, as well as the solvent resistance. This enables us to deliver a new generation of inexpensive 3D printable, crosslinked parts with robust thermomechanical properties.

The article "On reducing anisotropy in 3D printed polymers via ionizing radiation" by Steven Shaffer, Kejia Yang, Juan Vargas, Matthew A. Di Prima, and Walter Voit, *Polymer* 55 (2014) 5969e5979, is incorporated herein in its entirety for all purposes by this reference.

The article "Sequential Self-Folding Structures by 3D Printed Digital Shape Memory Polymers" by Yiqi Mao, Kai Yu, Michael S. Isakov, Jiangtao Wu, Martin L. Dunn & H. Jerry Qi, *Scientific Reports* 5, Article number: 13616 (2015), provides the state of technology information reproduced below.

Folding is ubiquitous in nature with examples ranging from the formation of cellular components to winged insects. It finds technological applications including packaging of solar cells and space structures, deployable biomedical devices, and self-assembling robots and airbags. Here we demonstrate sequential self-folding structures realized by thermal activation of spatially-variable patterns that are 3D printed with digital shape memory polymers, which are digital materials with different shape memory behaviors. The time-dependent behavior of each polymer allows the temporal sequencing of activation when the structure is subjected to a uniform temperature. This is demonstrated via a series of 3D printed structures that respond rapidly to a thermal stimulus, and self-fold to specified shapes in controlled shape changing sequences. Measurements of the spatial and temporal nature of self-folding structures are in good agreement with the companion finite element simulations. A simplified reduced-order model is also developed to rapidly and accurately describe the self-folding physics. An important aspect of self-folding is the management of self collisions, where different portions of the folding structure contact and then block further folding. A metric is developed to predict collisions and is used together with the reduced-order model to design self-folding structures that lock themselves into stable desired configurations.

The article "Sequential Self-Folding Structures by 3D Printed Digital Shape Memory Polymers" by Yiqi Mao, Kai Yu, Michael S. Isakov, Jiangtao Wu, Martin L. Dunn & H. Jerry Qi, Scientific Reports 5, Article number: 13616 (2015), is incorporated herein in its entirety for all purposes by this reference.

The article "3D Printing of Shape Memory Polymers for Flexible Electronic Devices" by Matt Zarek, Michael Layani, Ido Cooperstein, Ela Sachyani, Daniel Cohn, and Shlomo Magdassi, Adv. Mater. 2015, provides the state of technology information reproduced below.

Here, we demonstrate that it is possible to fabricate complex shape memory structures with a viscous melt (≈30 Pa s) using a commercial SLA printer (Picoplus39, Asiga) and a customized heated resin bath (FIG. 1a; photograph of the system setup is available in FIG. S1, Supporting Information). The 3D printing was performed by layer-by-layer UV curing at the bottom of the reservoir, curtailing the deleterious effect of molecular oxygen inhibition. [21] The build times were dependent on the size of the models and the layer thicknesses; for example, it took 44 min to print a 1 cm 3 cube with a 100 μm layer thickness (optimized printing parameters are presented in Table S1, Supporting Information). The drawback of slow print speeds in hindering adoption of additive manufacturing processes is well known but recently a new SLA technique was reported with print speeds up to two orders of magnitude faster that is resin agnostic. [22] The X-Y-axis resolution of the printer used in this study is 39 μm, whereas on the layer thickness (Z-axis), it can be as low as 1 μm. In our experiments, we used layer thickness of 100 μm. Specifically, the unreacted macromonomer was partially removed from the voids of the printed objects by immersion in warm isopropyl alcohol under sonication. Final curing was performed by additional UV exposure in the Asiga flash unit for 30 s.

The article "3D Printing of Shape Memory Polymers for Flexible Electronic Devices" by Matt Zarek, Michael Layani, Ido Cooperstein, Ela Sachyani, Daniel Cohn, and Shlomo Magdassi, *Adv. Mater.* 2015, is incorporated herein in its entirety for all purposes by this reference.

The article "Controlled Sequential Shape Changing Components by 3D Printing of Shape Memory Polymer Multimaterials" by Kai Yua, Alexander Ritchieb, Yiqi Maoa, Martin L. Dunnc, H. Jerry Qi, Procedia IUTAM 12 (2015) 193-203, provides the state of technology information reproduced below.

In this paper, we demonstrate the feasibility of using 3D printing technique to create functional graded shape memory polymers (SMPs) with both spontaneous and sequential shape recovery abilities. The created SMP components, with properly assigned spatial variation of the thermodynamical property distribution, react rapidly to a thermal stimulus, and return to a specified configuration in a precisely controlled shape changing sequence. The use of the 3D printing technique enables a manufacturing routine with merits of easy implementation, large design freedom, and high printing resolution, which promises to advance immediate engineering applications for low-cost, rapid, and mass production.

The article "Controlled Sequential Shape Changing Components by 3D Printing of Shape Memory Polymer Multimaterials" by Kai Yua, Alexander Ritchieb, Yiqi Maoa, Martin L. Dunnc, H. Jerry Qi, Procedia IUTAM 12 (2015) 193-203, is incorporated herein in its entirety for all purposes by this reference.

SUMMARY

Features and advantages of the disclosed apparatus, systems, and methods will become apparent from the following description. Applicant is providing this description, which includes drawings and examples of specific embodiments, to give a broad representation of the apparatus, systems, and methods. Various changes and modifications within the spirit and scope of the application will become apparent to those skilled in the art from this description and by practice of the apparatus, systems, and methods. The scope of the apparatus, systems, and methods is not intended to be limited to the particular forms disclosed and the application covers all modifications, equivalents, and alternatives falling within the spirit and scope of the apparatus, systems, and methods as defined by the claims.

The inventors have developed apparatus, systems, and methods for producing a part or a product by additive manufacturing using additive manufacturing material having components of bio-based composite Shape Memory Polymer (SMP) material. An additive manufacturing system provides movement of the additive manufacturing print head relative to the additive manufacturing substrate and to extrude the additive manufacturing material having components of bio-based composite shape memory polymer material from the additive manufacturing print head onto the additive manufacturing substrate to form the part or product as a composite of components of bio-based composite shape memory polymer material.

The inventors' apparatus, systems, and methods provide 3D printing regular microstructured architectures and subsequent complex macrostructures from additively manufactured bio-based composite thermoset shape memory polymer composite materials. The inventors' apparatus, systems, and methods for 3D additively manufactured parts utilizes up to a four axis controlled direct Ink Writing (DIW) system for the fabrication of thermally cured bio-based epoxy SMP carbon nano-fiber composite parts. The inventors' apparatus, systems, and methods provide a manufacturing process which allows for not only multi-functional materials to be printed within a single part (printing materials that exhibit shape memory at different temperatures in specific areas of the part), but also the ability to reform macro-structures after a preliminary partial cure, in which the parts maintain the micro-structure and their shape memory behavior.

The inventors' apparatus, systems, and methods have many uses including use for sensors, conductive materials, thermally actuated devices or components of larger structures. The material produced by the inventors' apparatus, systems, and methods is free standing and able to span gaps, therefore can be used for foam like micro-structures, which can then be formed into macro-structures. The materials produced by the inventors' apparatus, systems, and methods maintain their shape memory behavior. These properties allow the materials to be fabricated in almost limitless structures and programmed for multiple applications where two or more shapes by a single device.

The apparatus, systems, and methods are susceptible to modifications and alternative forms. Specific embodiments are shown by way of example. It is to be understood that the apparatus, systems, and methods are not limited to the particular forms disclosed. The apparatus, systems, and methods cover all modifications, equivalents, and alternatives falling within the spirit and scope of the application as defined by the claims.

BRIEF DESCRIPTION OF THE DRAWINGS

The accompanying drawings, which are incorporated into and constitute a part of the specification, illustrate specific embodiments of the apparatus, systems, and methods and, together with the general description given above, and the detailed description of the specific embodiments, serve to explain the principles of the apparatus, systems, and methods.

DETAILED DESCRIPTION OF SPECIFIC EMBODIMENTS

Figure 1:
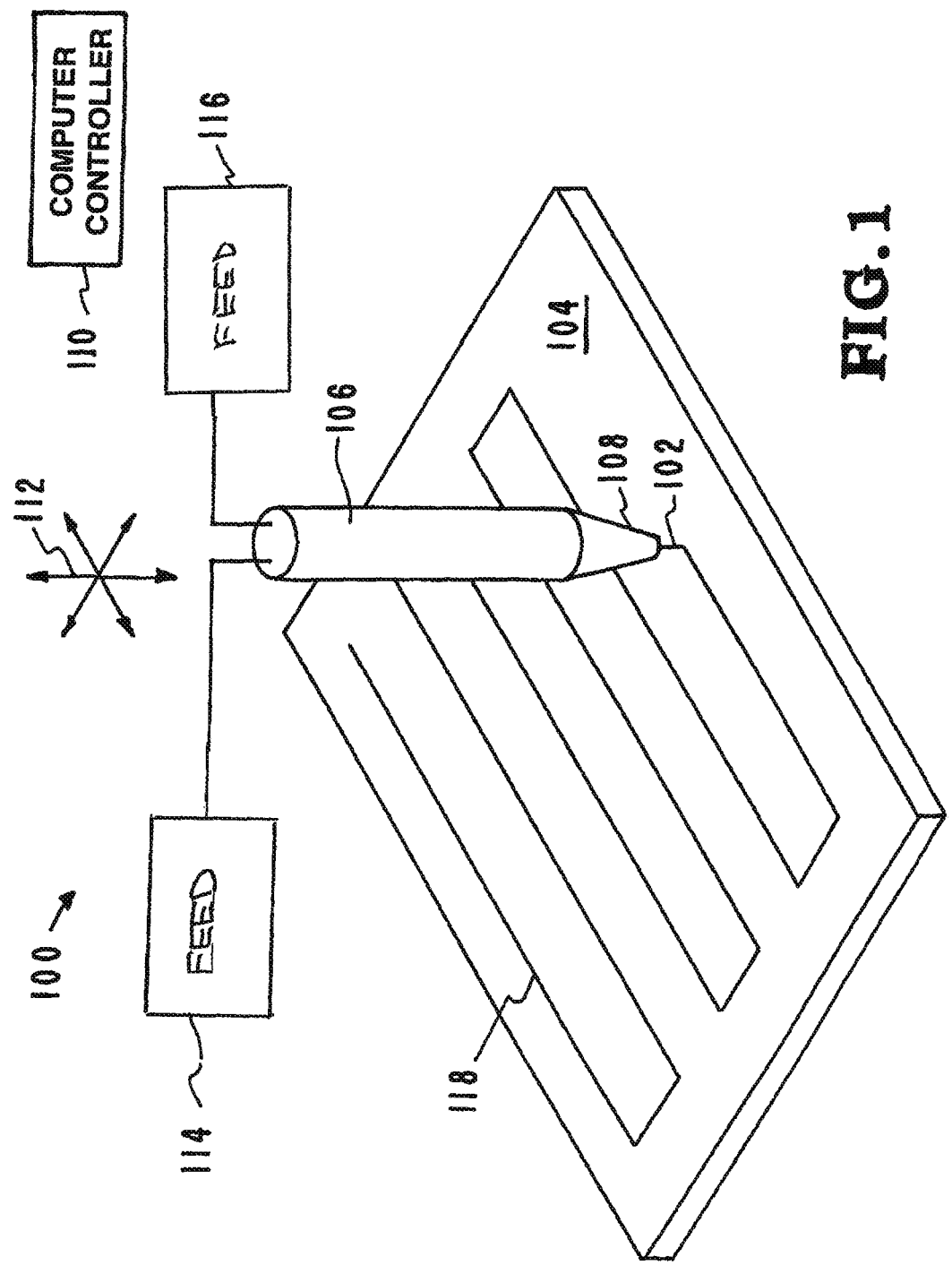
FIG. 1 illustrates one embodiment of the inventor's apparatus, systems, and methods.

Referring to the drawings, to the following detailed description, and to incorporated materials, detailed information about the apparatus, systems, and methods is provided including the description of specific embodiments. The detailed description serves to explain the principles of the apparatus, systems, and methods. The apparatus, systems, and methods are susceptible to modifications and alternative forms. The application is not limited to the particular forms disclosed. The application covers all modifications, equivalents, and alternatives falling within the spirit and scope of the apparatus, systems, and methods as defined by the claims.

Definitions

The terms defined below shall have the following meanings when used in this patent application:

"shape memory polymer material"—A polymeric smart material that has the ability to return from a deformed state (temporary shape) to its original (permanent) shape induced by an external stimulus (trigger), such as temperature change.

"bio-based material"—A material intentionally made from substances derived from renewable, living (or once-living) organisms.

Shape memory polymers (SMPs) and their composites offer a unique integration of low cost, easy processing, light weight, exhibit elastic deformation, potential exceptional mechanical properties, and multi-functionality. The ability of SMPs to remember and recover their original shapes has been advantageous for medical devices and applications in aerospace technologies. Most plastic processing techniques, such as extrusion, blow molding, injection molding, and resin transfer molding have been applied to enable mass production of thermoplastic devices with complex geometries. However, these traditional methods are difficult to fabricate 3D SMPs with spatial distribution of materials and micro-architectures for specific programmed deformation strategy, such as highly controlled sequential shape recovery.

Figure 2:
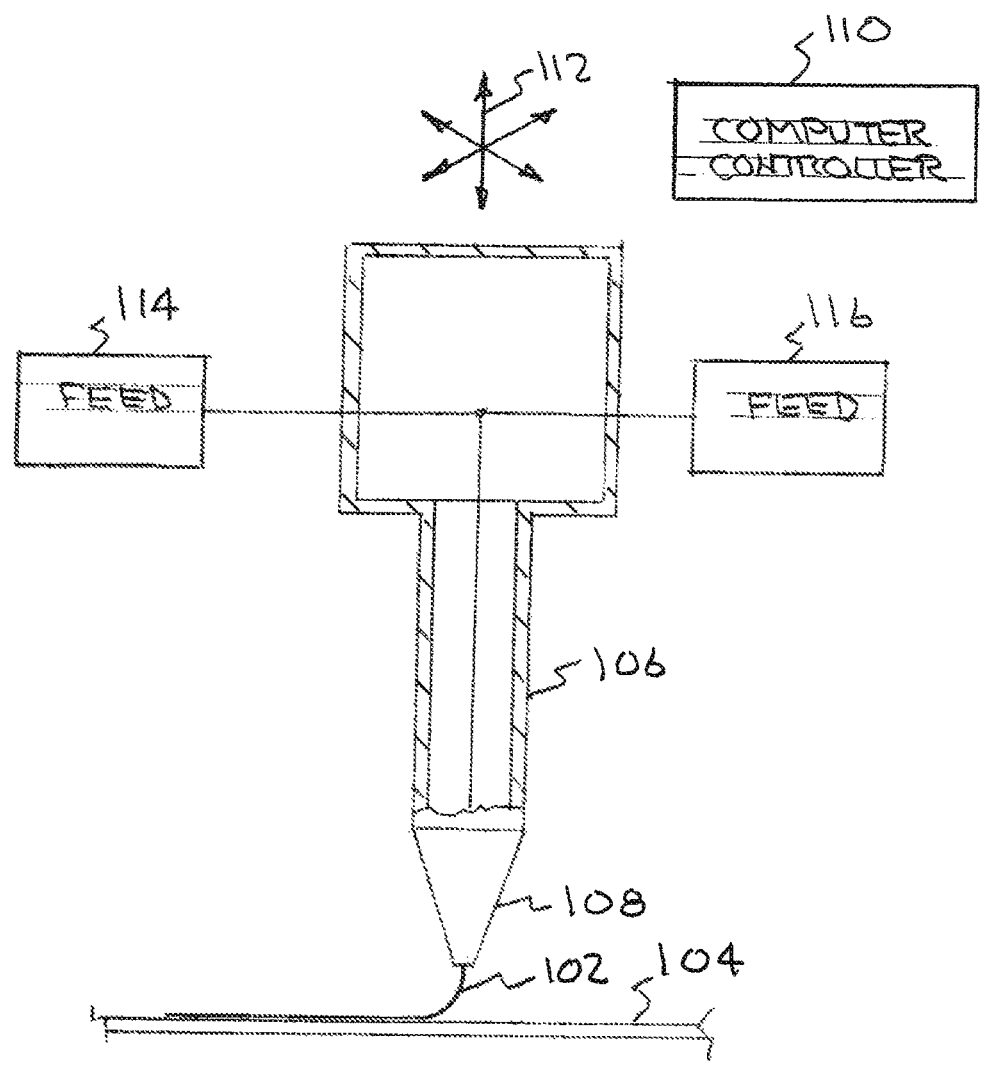
FIG. 2 is a cut away view of the print head shown in FIG. 1.

Referring now to the drawings and in particular to FIGS. 1 and 2, an embodiment of the inventor's apparatus, systems, and methods is shown. The embodiment is designated generally by the reference numeral 100. The embodiment 100 provides apparatus, systems, and methods for additive manufacturing of bio-based conductive shape memory polymer macrostructure parts and products with highly ordered microstructures. The inventor's apparatus, systems, and methods utilize additive manufacturing 3D printing to make a three-dimensional part or product. Successive layers of bio-based conductive shape memory polymer material are laid down via the extruder that is a computer controlled, three-axis motion-controlled stage. The three-dimensional parts and products can be of almost any shape or geometry and can be produced from a model or other electronic data source that is capable of generating G-Code, a numerical control programming language, that is used to control the three axis-motion controlled stage.

As illustrated in FIG. 1, extruded material 102 composed of a continuous filament of bio-based composite conductive shape memory polymer material is deposited on a substrate 104 by print head 106. The filament may be from a single extrusion feed or multiple extrusion feed 114 and 116. The print head 106 has a nozzle 108 for extruding the filament 102 onto the substrate 104. Movement of the print head 106 is controlled by computer controller 110 which provides freedom of movement along all axes as indicated by the arrows 112. The product to be created by the system 100 is fed to the computer controller 110 with the widely used numerical control programming language G-Code, although other programming languages may be used for deposition of these materials. The computer controller 110 uses the instructions to move the print head 106 through a series of moments along the surface 104 forming the part or product to be created by the system 100. The print head 106 receives a continuously feed of material that is moved through the print head 108 and nozzle 108 and emerges as the extruded material 102. Movement the print head 106 on the surface 104 forms a pattern 118 providing the part or product to be created by the system 100.

Referring now to FIG. 2 additional details of the inventor's apparatus, systems, and methods 100 are provided. FIG. 2 is a cut away view of a portion of the system 100 showing the print head 106 with a nozzle 108 that extrudes the material 102 onto the substrate 104. The extruded material 102 is composed of a bio-based conductive shape memory polymer and is deposited on the substrate 104 to form the part or product to be printed by print head 106. The bio-based conductive shape memory polymer may be from a single extrusion feed or multiple extrusions feed 114 and 116 associated with one another to form the continuous bio-based conductive shape memory polymer material extrusion.

Figure 3:
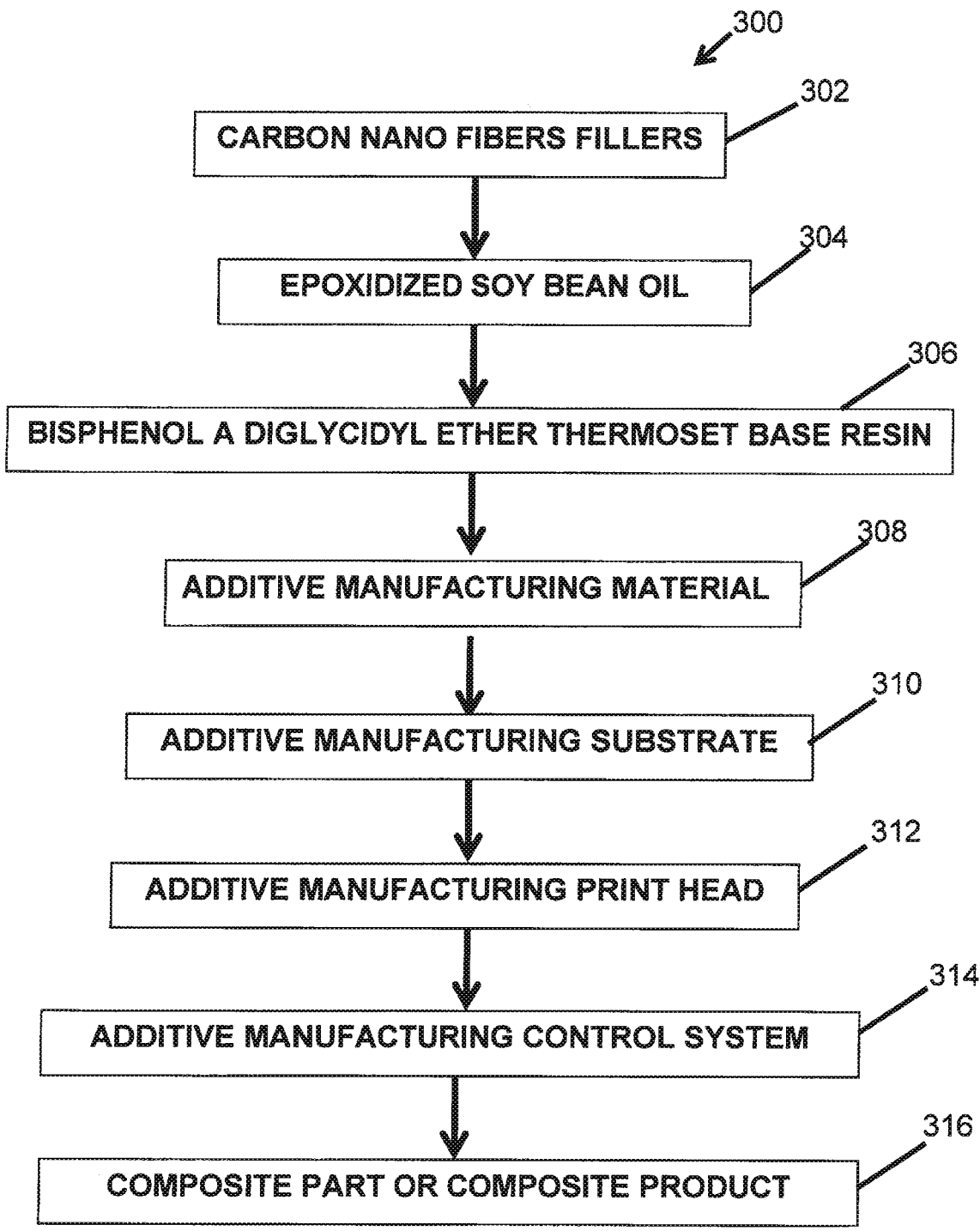
FIG. 3 illustrates components of various embodiments of the inventor's apparatus, systems, and methods described in the examples.

Shape memory polymers (SMPs) and their composites offer a unique integration of low cost, easy processing, light weight, elastic deformation capacity, potential exceptional mechanical properties, and multi-functionality. The ability of SMPs to remember and recover their original shapes has been advantageous for applications in medical devices and aerospace engineering. Most plastic processing techniques, such as extrusion, blow molding, injection molding, and resin transfer molding have been applied to enable mass production of thermoplastic devices with complex geometries. However, these traditional methods are difficult to fabricate 3D SMPs with spatial distribution of materials and micro-architectures for specific programmed deformation strategy, such as highly controlled sequential shape recovery The inventor's apparatus, systems, and methods will now be described purely by way of non-limitative examples, with reference to individual figures of the attached drawings, which illustrate embodiments of the inventor's apparatus, systems, and methods. Components of various embodiments of the inventor's apparatus, systems, and methods described in the examples are illustrated in FIG. 3. The inventor's apparatus, systems, and methods that provide additive manufacturing apparatus for producing a part or a product are designated generally by the reference numeral 300. As illustrated in FIG. 3, carbon nano fibers fillers 302, epoxidized soy bean oil 304, Bisphenol A diglycidyl ether thermoset base resin 306, provide additive manufacturing material 308. An additive manufacturing substrate 310 and an additive manufacturing print head 312 are controlled by an additive manufacturing control system 314. The additive manufacturing control system 314 provides movement of the additive manufacturing print head 312 relative to the additive manufacturing substrate 310 and that extrudes the additive manufacturing material including components of shape memory polymer material and bio-based material from the additive manufacturing print head 312 onto the additive manufacturing substrate to 310 form the part or product that is a composite 316 of the components of shape memory polymer material and bio-based material.

Example 1

Carbon nano fibers (CNF) fillers were added into epoxidized soy bean oil (ESBO) and Bisphenol A diglycidyl ether (BFDGE) thermoset base resins. Simultaneously, acetone was added to distribute and remove agglomerates of the fibers with sonication and mixing. After drying and degassing, a homogeneous composite ink with designed rheological properties was obtained. The ink was extruded through a micro nozzle to print complex 3D architectures. At this point two paths for final parts are available. Route 1: The printed part was thermally cured at 80° C. for 16 hr and then post curing at 150° C. for 2 hr. Route 2: Origami folding of the material after an initial partial cure of the 3D printed part with a subsequent cure at 80° C. for 12 hr and then post curing at 150° C. for 2 hr. The two routes converge at the programming step. The programming process was conducted at 80-100° C. for 5 min by applying an external stress to deform the part and maintaining the shape until the temperature decreased to 20° C. for 2 min. Finally, the deformed part can recover to the original shape by simply resistive heating about 2 min or thermally heating to 80-100° C. for a subsequent occurrence for 2 min. Scale bar is 1 μm for the scanning electron microscopy (SEM) image and 1 cm for the demonstrated parts at the bottom of the panel.

Example 2

The inventors demonstrate their approach wherein 3D periodic structures were assembled from a colloidal ink. The ink was housed in a syringe (barrel diameter of 4.6 mm) mounted on the z-axis of a three-axis motion-controlled stage, and dispensed through a cylindrical deposition nozzle (250 lm in diameter) onto a moving x-y stage (velocity of 5 mms-1).

The lattice structures produced consist of a linear array of rods aligned with the x- or y-axis such that their orientation is orthogonal to the previous layer, with a rod spacing (L) of 250 lm. The top two layers of the 3D structure were acquired by noncontact laser profilometry. These data reveal the excellent height uniformity of the deposited features even as they span gaps in the underlying layer(s). The cross-sectional cut through the lattice shows that the rods maintain their cylindrical shape during the multilayer deposition process.

The higher magnification view of the rod surface reveals the disordered nature of the colloidal gel-based ink used to fabricate such structures. The shape of these viscoelastic ink filaments conforms to the nozzle geometry, allowing one to print 3D structures composed of non-cylindrical features.

Example 3

Several 3D lattices were fabricated by direct ink writing with concentrated PZT ink (ø=0.47). The inventors first produced 3-3 structures in which both the ferroelectric and polymeric phases are interconnected in all three dimensions. Using this assembly route, the device architecture was varied rapidly simply by changing the printing pattern. For example, solid face-plates of PZT or solid face-plates with an outer PZT ring were added to the 3-3 structures to form 3-2 and 3-1 composites, respectively. In each case, the diameter of the PZT rods was fixed at ca. 160 μm, while their spacing in the x-y directions was systematically varied to yield PZT volume fractions ranging from 0.17 to 1. These skeletal PZT lattices were then sintered by heating them to 1300° C. for 2 h. After densification, the intervening pore space between the PZT rods was infiltrated with an epoxy resin. The composites and monolithic PZT disks were then polished, had electrodes deposited by gold sputtering, and then poled at 25 V cm$^{-1}$ for 30 min at room temperature followed by short-circuiting for 1 h to accelerate aging. Finally, their dielectric constant and hydrostatic piezoelectric response were measured.

This enhanced the hydrostatic figure of merit ($d'_h \, g_h$) of each composite. The 3-1 composites exhibited a 70-fold increase above that of monolithic PZT owing to a dramatically reduced dielectric constant and maintenance of a high piezoelectric response at 40 vol % PZT. The inventors' approach can be readily extended to a broad range of composite architectures, materials, and target applications, including other functional composites, structural composites (e.g., alumina/aluminum IPCs), and bone scaffolds (e.g., hydroxyapatite).

Example 4

Wax-based materials served as excellent fugitive inks for direct writing of 3D microvascular networks. First, these inks must flow through a fine deposition nozzle under high shear, yet be self-supporting under ambient conditions, even as they span gaps in the underlying layer(s). Second, the ink scaffold must maintain its shape during resin infiltration and curing. Finally, the ink scaffold must liquefy at modest temperatures to facilitate its removal from the polymer matrix, leaving behind an interconnected network of micro-channels, in a process akin to the lost-wax technique.

The inventors developed a fugitive organic ink based on a binary mixture of microcrystalline wax (Mw=1450 g $mol^{-1}$) and a low-molecular-weight organic phase (Mw=840 g $mol^{-1}$) for direct write assembly. The ink elasticity, as characterized by the plateau value of the storage shear modulus (G'), increased linearly from ca. 0.1 to 1 MPa with increasing weight fraction of microcrystalline wax. As a benchmark, the inventors include the data obtained for a commercial organic paste (Prussian blue paste, Loctite) used previously for microvascular network printing. Both the G' and $t'_y$ values observed for the binary organic ink exceed those reported for the commercial organic ink by more than an order of magnitude under ambient conditions. As a result of its superior mechanical properties, the binary ink enables the fabrication of microvascular networks composed of more than 100 layers with longer spanning filaments.

The time-dependent relaxation behavior of each ink was studied by optically imaging freestanding ink filaments (ca. 1 mm in diameter) produced by direct writing. Representative optical images of ink filaments spanned a 10 mm gap for both the binary and commercial organic inks. The binary ink filament experiences significantly less deformation over the experimental timescale probed relative to the filament produced from the commercial ink. Their mid-span deflection as a function of time was quantified by image analysis. Both inks displayed similar deformation behavior with an initially high deflection rate followed by gradual retardation before reaching a constant, lower deflection rate. Ultimately, the ink recovers to its plateau G' value, as revealed by the onset of a reduced deflection rate at longer times (>10 s).

Example 5

The inventors created structures by depositing a fugitive ink through a cylindrical nozzle (150 µm in diameter) onto a moving x-y platform (deposition speed of 6 mm $s^{-1}$). After the initial layer is generated, the platform is incremented in the z-direction and another layer is deposited. This process is repeated until the desired 3D ink scaffold is fabricated. The interstitial pore space between patterned filamentary features is then infiltrated with a liquid resin consisting of 2.5:1 epoxide (EPON 828, Shell Chemicals) and cured for 24 h at 22° C. followed by 2 h at 60° C. At this temperature, the ink scaffold liquefies and can be removed under light vacuum to yield an interconnected 3D network of hydrophilic micro-channels.

Highly efficient fluid-mixing devices, such as square and triangular-spiral towers, can be embedded within these 3D microvascular networks using standard photomasking techniques. These mixing elements were introduced into this 3D network by first infiltrating the microchannels with a photocurable resin (Model 61, Norland Products) followed by subsequent patterning and UV flood exposure (360 nm wavelength for 60 s at 100 W). After the photopolymerization, the unreacted resin was drained under a light vacuum leaving behind the desired patterned features.

Although the description above contains many details and specifics, these should not be construed as limiting the scope of the application but as merely providing illustrations of some of the presently preferred embodiments of the apparatus, systems, and methods. Other implementations, enhancements and variations can be made based on what is described and illustrated in this patent document. The features of the embodiments described herein may be combined in all possible combinations of methods, apparatus, modules, systems, and computer program products. Certain features that are described in this patent document in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can in some cases be excised from the combination, and the claimed combination may be directed to a subcombination or variation of a subcombination. Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described above should not be understood as requiring such separation in all embodiments.

Therefore, it will be appreciated that the scope of the present application fully encompasses other embodiments which may become obvious to those skilled in the art. In the claims, reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device to address each and every problem sought to be solved by the present apparatus, systems, and methods, for it to be encompassed by the present claims. Furthermore, no element or component in the present disclosure is intended to be dedicated to the public regardless of whether the element or component is explicitly recited in the claims. No claim element herein is to be construed under the provisions of 35 U.S.C. 112, sixth paragraph, unless the element is expressly recited using the phrase "means for."

While the apparatus, systems, and methods may be susceptible to various modifications and alternative forms, specific embodiments have been shown by way of example in the drawings and have been described in detail herein. However, it should be understood that the application is not intended to be limited to the particular forms disclosed. Rather, the application is to cover all modifications, equivalents, and alternatives falling within the spirit and scope of the application as defined by the following appended claims.

The invention claimed is:

1. An additive manufacturing method for producing a part or a product, comprising:
   providing an additive manufacturing substrate;
   positioning an additive manufacturing print head in operative position relative to said additive manufacturing substrate;
   providing bio-based shape memory polymer additive manufacturing material in said additive manufacturing print head; and
   using an additive manufacturing control system to provide movement of said additive manufacturing print head relative to said additive manufacturing substrate and to extrude said bio-based shape memory polymer additive manufacturing material from said additive manufacturing print head onto said additive manufacturing substrate to form the part or product
   wherein said bio-based shape memory polymer additive manufacturing material includes components of shape memory polymer material and bio-based material and
   wherein said step of providing bio-based shape memory polymer additive manufacturing material in said additive manufacturing print head comprises the steps of
   adding carbon nano fibers fillers to epoxidized soy bean oil and Bisphenol A diglycidyl ether thermoset base resin to from an intermediate material,
   adding acetone to said intermediate material,
   sonicating said intermediate material,
   mixing said intermediate material,
   drying said intermediate material, and
   degassing said intermediate material.

* * * * *